UNITED STATES PATENT OFFICE.

RUDOLPH RUMBEL, OF OMAHA, NEBRASKA.

COMPOSITION OF MATTER.

No. 913,585.

Specification of Letters Patent.

Patented Feb. 23, 1909.

Application filed May 18, 1908. Serial No. 433,430.

*To all whom it may concern:*

Be it known that I, RUDOLPH RUMBEL, a citizen of the United States, residing at Omaha, in the county of Douglas and State of Nebraska, have invented a certain new and useful Composition of Matter, of which the following is a specification.

This invention relates to a composition of matter intended for protecting wearing surfaces or surfaces exposed to the weather or exposed to wet or dampness.

The principal object of the invention is to provide a composition of matter which may be applied, when in a plastic or semi plastic condition upon wood, stone, glass or other material, which will readily harden without shrinkage, and will remain reliably adhesive to the surface of the object whereon it is placed or spread, and which may have, as one of its ingredients, a substance which will adequately resist frictional wear or erosion, will resist injury from exposure to sun heat, and will protect wood from the action of fire.

Another object of the invention is the provision of a composition of matter having the properties described, which will be comparatively inexpensive.

The purpose of the invention is to provide a covering for the exterior walls of a building, as a substitute for paint; also for covering the roofs of buildings, whether of tin or other metal or wood; also to form the filler for seams between glass plates where it is desirable that the material shall adhere to a part of the glass surface, or otherwise; and to form an exterior coating for boats, water vessels and the like,—said covering to have the property of remaining adhesive whether applied to form a thick covering or used as a thin coating upon the object to be protected.

The composition of matter consists of the following ingredients: sand, 20 parts in bulk, quick lime 2 parts in bulk, oxid of lead, 2 parts in bulk, oxid of iron, 2 parts in bulk.
These are mixed thoroughly, and the mass mixed with linseed oil to a plastic consistency. The composition thus provided, is applied to wood, glass or metal to form a coating of any desired thickness. The quick lime operates as a drier. The oxid of lead and oxid of iron cause the particles to adhere, and the sand which forms the principal part of the compound, resists ordinary frictional wear; the substance when dry has a density equal to that of sandstone, and when dry adheres firmly to the object upon which it is spread.

Two parts, in bulk, of white lead may be substituted for the oxid of lead, if desired, and the result will be substantially the same; also I have at times omitted the oxid of iron, but prefer its use where the composition is to be used as a protection against rain or water.

For covering boats, and in other cases where a light-weight covering is desired, I have used equal parts, in bulk, of sand and coal ash to make 20 parts, and mixed the same with one part oxid of lead and two parts oxid of iron, these parts being in bulk, the mass then to be mixed with linseed oil to a plastic consistency, as in other cases.

To form a coating somewhat lighter in weight, I employ sand, coal ash and hard wood pulp, each of equal amounts in bulk to make 20 parts, oxid of lead 1 part, quick lime 1 part, oxid of iron 2 parts; these are mixed in the usual manner with linseed oil to form a compound of plastic consistency. While this compound varies only slightly from those already described, it is lighter and more useful for covering the bottoms of boats and various light-weight articles whose surfaces are to be exposed to the water.

Having fully described my invention, what I claim as new and desire to secure by Letters Patent is,—

1. The herein described composition of matter, comprising, in bulk, sand 20 parts; quick lime 2 parts; oxid of iron 2 parts; the same to be mixed with linseed oil to form a plastic mass.

2. The herein described composition of matter, comprising, in bulk, sand 20 parts; oxid of lead 2 parts, oxid of iron 2 parts and a suitable drying substance; said ingredients made plastic by use of linseed oil mixed therewith.

3. A composition of matter comprising in bulk, sand 10 parts, coal ash 10 parts, oxid of lead 1 part, oxid of iron 2 parts; said ingredients mixed to the consistency of a plastic mass, by using therewith, linseed oil.

4. A composition of matter, consisting of sand, coal ash and hard-wood pulp, each a one-third part in bulk, to comprise 20 parts; to which is added 1 part in bulk oxid of lead; 1 part in bulk quick lime; 2 parts in bulk oxid of iron; said ingredients to be mixed with linseed oil to form a plastic mass.

In testimony whereof I have affixed my signature in presence of two witnesses.

RUDOLPH RUMBEL.

Witnesses:
 HIRAM A. STURGES,
 GEO. WYCOFF.